Figure 1:
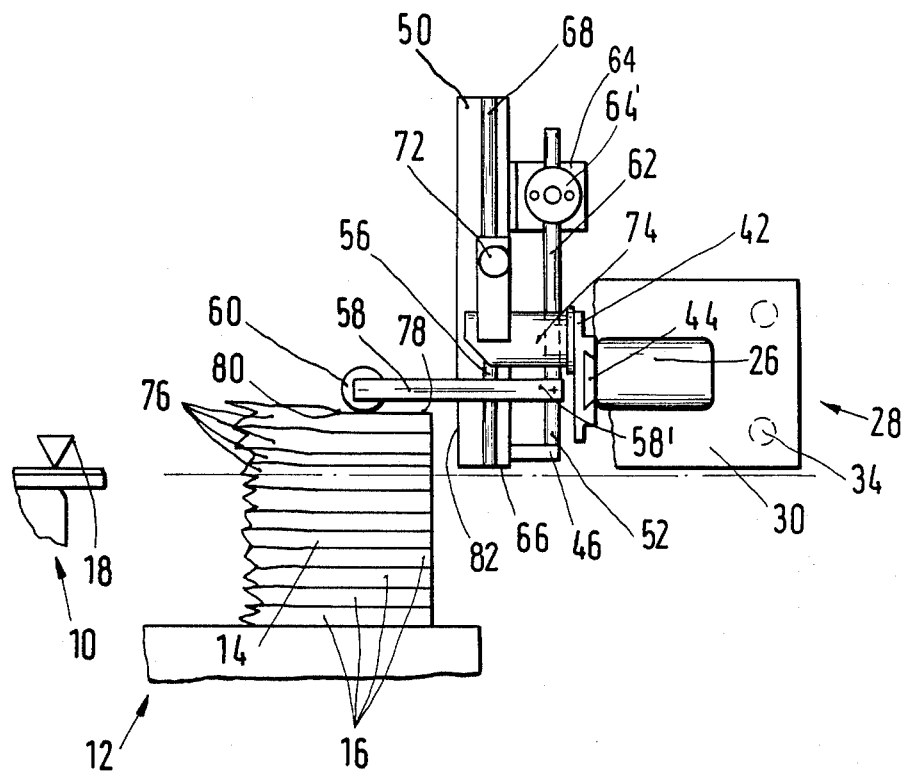

United States Patent [19]

Jenkner

[11] Patent Number: 4,726,724
[45] Date of Patent: Feb. 23, 1988

[54] PANEL FEED DEVICE FOR FEEDING PANEL-TYPE WORKPIECES DEPOSITED ON A LIFT TABLE TO PANEL SPLITTING APPARATUS

[76] Inventor: Erwin Jenkner, Lindenstrasse 13, Gechingen, Fed. Rep. of Germany, D-7261

[21] Appl. No.: 858,059

[22] Filed: May 1, 1986

[30] Foreign Application Priority Data

May 2, 1985 [DE] Fed. Rep. of Germany ....... 3515729

[51] Int. Cl.$^4$ ............................................. B65G 59/02
[52] U.S. Cl. .................................... 414/119; 271/130; 414/117
[58] Field of Search ...................... 414/117, 118, 119; 271/128, 130, 139, 152, 153, 154, 155

[56] References Cited

U.S. PATENT DOCUMENTS 1,072,936  9/1913  Freeman ............................ 271/130
4,431,358  2/1984  Jenkner ........................ 414/119 X

FOREIGN PATENT DOCUMENTS 623799  9/1978  U.S.S.R. ............................... 271/128
670517  7/1979  U.S.S.R. ................................ 414/119

OTHER PUBLICATIONS

Hohner Elektrotechnik Catalog of Various Prior Art Rotary Encoders. Dated Approximately Sep. 1981.

Primary Examiner—Leslie J. Paperner
Attorney, Agent, or Firm—Dick and Harris

[57] ABSTRACT

A panel feed device arranged on a horizontally displaceable feed carriage for feeding panel-type workpieces deposited on a lift table to panel splitting apparatus which is provided with a feed member which is arranged in a vertically displaceable manner on the feed carriage and during the feed motion of the latter can be made to abut an edge of a workpiece or set of workpieces with its lower end piece, and with a support arm which extends in the feed direction beyond the feed member, is arranged in a vertically displaceable and detainable manner on the latter, and can also be positioned on the workpiece or set of workpieces to be shifted, is described.

To enable conversion of such a panel feed device without manual interference in a very short time in order to shift a desired number of workpiece panels from a panel stack placed in readiness, the support arm is automatically adjustable through a preselectable path together with the lift table, relative to the feed member fixed, in particular, in a bottom initial position on the feed carriage, in relation to the lower end face of the feed member, and when the preselected height position is reached, the support arm and the feed member can be automatically fixed with respect to one another, with the feed member then being freely movable in the vertical direction relative to the feed carriage.

8 Claims, 4 Drawing Figures

PANEL FEED DEVICE FOR FEEDING PANEL-TYPE WORKPIECES DEPOSITED ON A LIFT TABLE TO PANEL SPLITTING APPARATUS

The invention relates to a panel feed device arranged on a horizontally displaceable feed carriage means for feeding one or more panel-type workpieces deposited on lift table surface means toward or into a panel splitting device.

A panel feed device of this kind is already known, but this cannot be substantiated by a publication.

Since panel-type workpieces which are to be shifted individually or as a set from the lift table are often not flat, but wavy and warped both in the direction of feed and in the direction extending transversely thereto, it is necessary for the feed member to be held during the feed motion of the feed carriage floatingly thereon in the vertical direction. It is then carried along upwardly or downwardly in the vertical direction by the support arm resting on the workpiece panel to be fed or on the top workpiece panel of a panel stack to be fed, insofar as the point at which the support arm rests on a workpiece panel is correspondingly vertically displaced on account of the above-explained unevennesses during the feed procedure.

This ensures that the edge of the lower end face of the feed member facing the panel stack resting on the lift table while travelling over the top workpiece panel of the panel stack resting on the lift table cannot come into contact with and harm its upper surface.

In this known construction, the feed member for shifting a workpiece panel or a desired number of such panels from a panel stack is set by the support arm which for this purpose is released from the feed member and, in relation to its lower end face, displaced manually through a corresponding path and then fixed again on the feed member.

Since several panel feed devices are usually mounted in laterally spaced relationship on the feed carriage, this setting of the feed member must be made correspondingly often, which is particularly troublesome and time-consuming since the number of workpiece panels to be shifted usually has to be changed from one feed cycle to the other. The conversion time which correspondingly reduces the efficiency of the panel feed device and consequently the non-productive time of this known device are therefore long.

The object underlying the invention is to indicate a panel feed device arranged on horizontally displaceable feed carriage means for feeding one or more panel-type workpieces deposited on lift table surface means toward or into a panel splitting device, which without the use of an adjustment device requiring auxiliary energy and without manual interference may be set or converted within a very short time in order to shift a desired number of workpiece panels from a panel stack placed in readiness.

This object is attained in accordance with the invention to be hereinafter described and which includes: a feed member, vertically adjustable relative to the workpiece panel supply, and a support arm which, in cooperation with a control apparatus, regulates the vertical adjustment of the feed member.

To set the panel feed device according to the invention, the support arm moves automatically relative to the fixed feed member in accordance with a given setting command in one of its possible directions of adjustment, and the feed member remains at a standstill, in particular, in a bottom initial position.

Once the required position of the support arm is reached, it is coupled with the feed member which is released at the feed carriage in order to effect vertical motions. During the feed motions, the feed member can therefore be carried along in the vertical direction by the support arm upon the occurrence of unevennesses which result from warped or wavy workpiece panels and over which the material to be shifted must be transported. This ensures that the front edge of the lower end face of the feed member cannot damage the surface of the top workpiece panel of the panel stack located on the lift table. At the end of a feed motion, the feed member is restrained from vertical motion in order to prevent marring of the upper surface of the top most panel during the return or reset motion.

In the event of several panel feed devices being arranged on the feed carriage, an advantageous construction enables their support arms to be simultaneously adjusted when readjustment is required.

The support arm of the device according to the invention may be adjusted via a drive device independently of the lift table. The present invention advantageously provides a construction in which the lifting motion of the stack of workpieces is exploited to assist in adjustment of the support arm, rendering use of an independent drive device unnecessary.

Further advantageous embodiments of the panel feed device constitute the subject matter of further subclaims.

Further features and details of the invention are explained in the following description of a preferred embodiment of an inventive panel feed device illustrated in the drawings and also in the subclaims.

Figure 2:
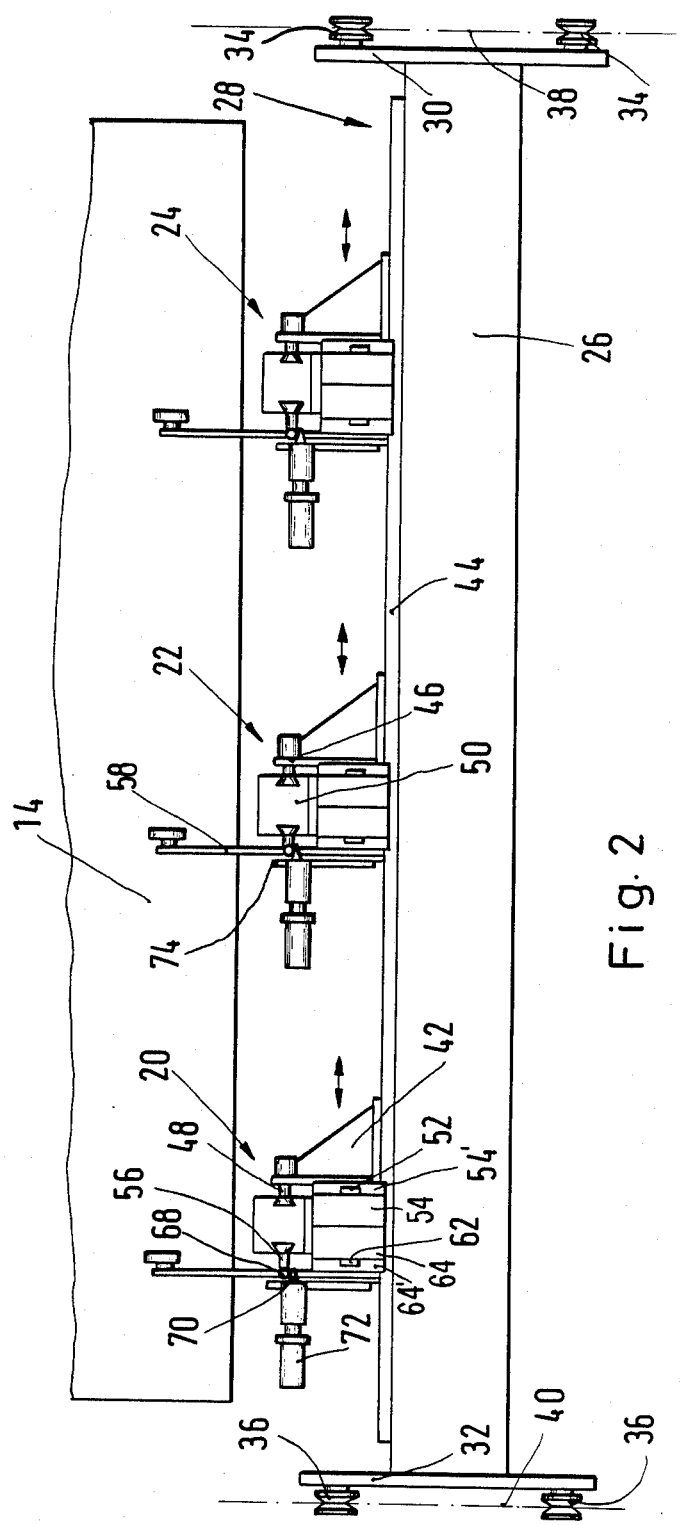

The drawings shown in diagrammatic representation:

FIG. 1 a side view of a total of three panel feed devices mounted on a feed carriage is seen from the direction of Arrow A in FIG. 2.

FIG. 2 a plan view of the feed carriage equipped with the panel feed devices.

Figure 3:
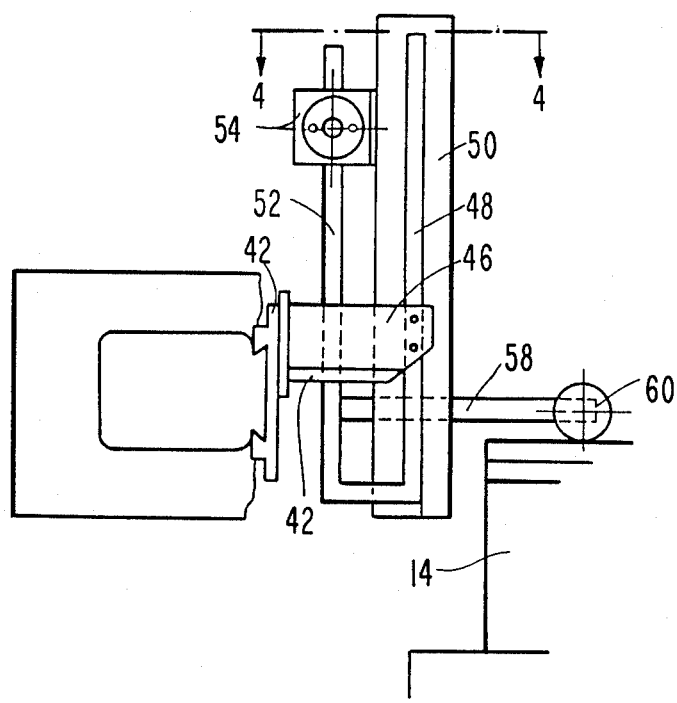
Figure 4:
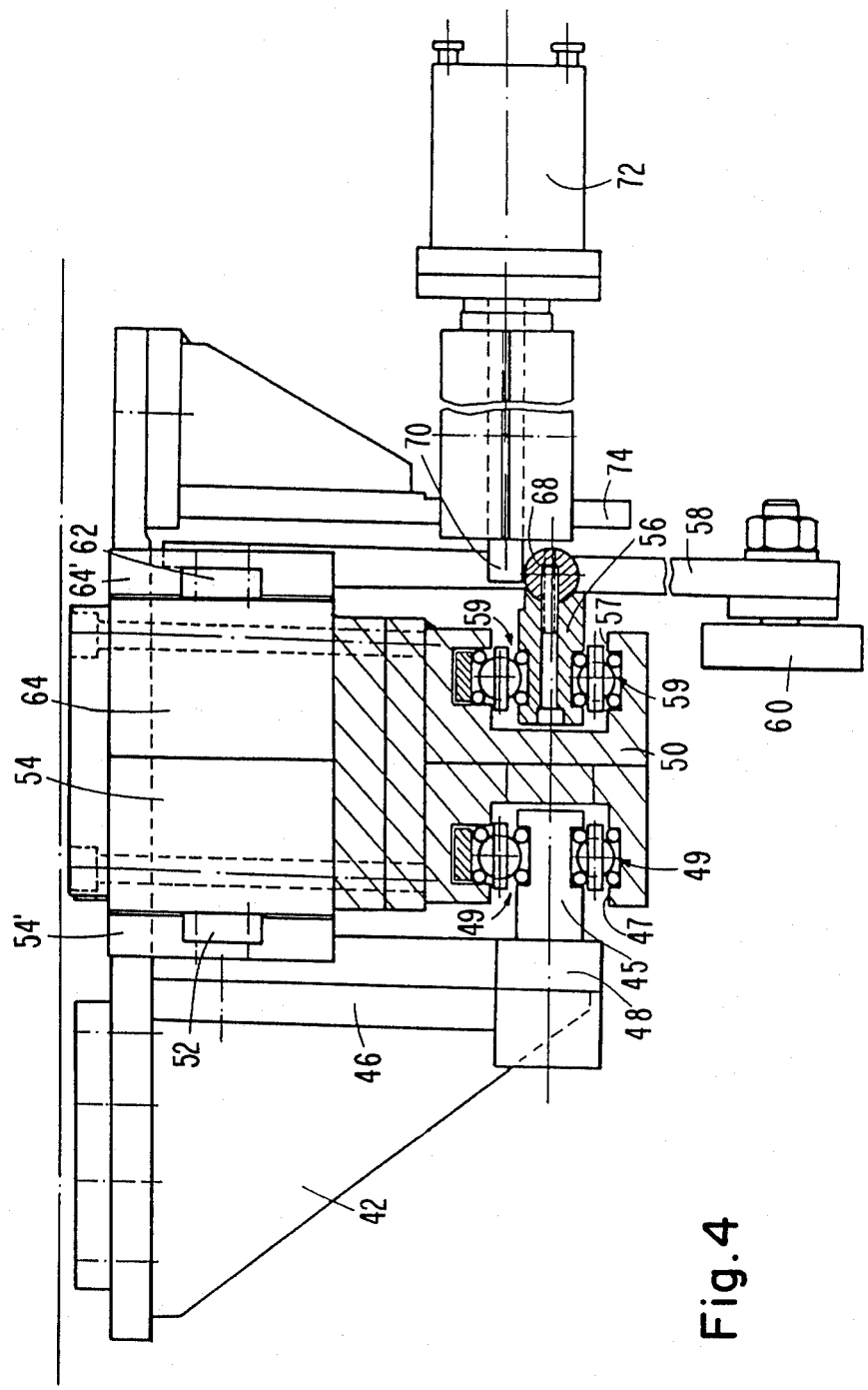

FIG. 3 a side view of one panel feed device, as seen in the direction of Arrow B of FIG. 2. FIG. 4 a top view of one panel feed device, partly in section, taken along line 4—4 of FIG. 3.

Arranged behind a panel splitting system, known per se, but not illustrated in the drawings, for splitting panel-type or platelike workpieces into various formats, with its panel accommodating table designated in its entirety in FIG. 1 by reference numeral 10, is a lift table 12, known per se, which receives a panel stack 14, from which either one or the same number of workpiece panels 16 may be shifted onto the panel accommodating table 10 of the panel splitting system.

Individual workpiece panels or sets of panels are fed to the top table surface 18 of the panel accommodating table 10 of the panel splitting apparatus, for example, with the aid of three panel feed devices designated in their entirety by 20, 22 and 24, which are arranged in laterally spaced, adjacent relationship, as seen in FIG. 2, on a cross-beam 26 of a feed carriage 28 in a horizontally adjustable and detainable manner. The cross-beam 26 is held between two guide supports 30, 32 which are guided in a horizontally displaceable manner by two pairs of guide rolls 34 and 36, respectively, arranged in pairs in superimposed relationship on one guide rail each 38 and 40, respectively, which are merely indicated as a dot-and-dash line.

The panel feed devices 20, 22 and 24 correspond to one another in their structural design and are each held by a receiving device 42, for example, on a dovetail 44 of the cross-beam 26 in a displaceable and detainable manner.

The panel feed devices 20, 22, 24 are each designed as follows:

Making reference to FIG. 3, in which extending from the receiving device 42 in the direction of the panel stack 14 is a carrier 46 at the free end of which a first vertical guide bar 48 extending upwardly from the latter is attached. Guided along this guide bar 48 is a feed member 50 preferably of beam-type configuration for both vertical displacement and detention relative to the latter. A clamping bar 52, which extends vertically upward away from the carrier 46 and of which only the lower end piece connected to the carrier 46 is apparent from FIG. 1, serves this purpose. FIG. 3 indicates how vertical guide bar 48 is attached to the feed direction end of carrier 46 and is firmly connected at its lower end to the lower end of clamping bar 52. Associated with this clamping bar 52 is a clamping cylinder 54, having clamping member 54' which is stationarily arranged on feed member 50 with whose aid the feed member so can be fixed on the receiving device 42 via clamping bar 52 and thus the feed member 50 detained relative to the first guide bar 48. As shown more clearly in FIG. 4, guide bar 48 engages, with a guide web 45, a longitudinal groove 47 of feed member 50, and ball-type guides 49, inserted on either side of longitudinal groove 47 enable guidance of feed member 50 along web 45.

Displaceably guided on the feed member 50 is a second vertically extending guide bar 56 which engages a longitudinal groove 57 of feed member 50 and is guided along feed member 50 by ball-type guides 59. At the lower end of guide bar 56 is a support arm 58 which protrudes in the shift direction beyond the feed member 50 and ends above the lift table 12 is rigidly attached. This support arm 58 carries at its front end a feeler roll 60, while its rear end piece extends beyond the feed member 50 in the direction of the receiving device 42. This arm end piece 58' extending freely rearwardly as shown in FIG. 1 carries a second upwardly extending, vertically clamping bar 62 which is detainable on the feed member 50 by means of a clamping cylinder 64, with clamping member 64', as seen in FIG. 4, arranged on the rear side of the feed member 50.

The second guide bar 56 guided on the feed member 50 advantageously simultaneously constitutes a component of a mechanism for preselecting the height of the support arm 58 in relation to the lower end face 66 of the feed member 50 by carrying, for example, a rod-shaped information member 68 which extends along the guide bar 56. Associated with this information member 68 is a sensing member 70, with whose aid the path covered by the support arm 58 relative to the feed member 50 may be ascertained and a control signal for stopping the support arm 58 at a preselected height triggered.

In the present embodiment, as seen in FIG. 4, the sensing member 70 preferably constitutes a truncated-cone-shaped roll, known per se, of an incremental rotary encoder 72, such as is known in the prior art, which is stationarily arranged on a further carrier 74 of the receiving device 42.

The roll constituting the sensing member 70 is pressed onto the rod-shaped information member 68 in such a way that reliable rotation of the rotary encoder 72 is ensured in the event of vertical motion of the latter. Information, in the form of a signal, is then provided by rotary encoder 72 to a machine control system, not forming part of this invention and not shown, but to which lift table 12, feed carriage 28, clamping cylinder 54 and clamping cylinder 64 are responsive. The described mechanism for preselecting the height of the support arm 58 could also work in a known, contactless manner by, for example, providing as information member 68 a binary coded scale which is sensed photoelectrically. This mechanism may therefore have any feasible known design in order to position the support arm 58 at a desired height in an electronically controlled manner.

The panel feed devices 20, 22, 24 operate in conjunction with the feed carriage 28 and the lift table 12 in the following manner:

It is assumed that of the panel stack 14 placed in readiness on the lift table 12, one panel set 76 each including three workpiece panels 16, is to be shifted onto the panel accommodating table 10 of the panel splitting apparatus.

As shown in FIG. 1, the support arm 58 is to be set relative to the lower end face 66 of the feed member 50 in such a way that in the lower initial position of the latter, the feeder roll 60 of the support arm 58 comes into contact with the upper surface 78 of the uppermost stack panel when the lift table 12 travels upwardly. In this case, it is ensured that during the transportation motion of the feed carriage 28 in the direction of the panel splitting apparatus a total of three workpiece panels are grasped by the feed member 50 and pushed down from the panel stack 14 onto the panel accommodating table 10 of the panel splitting apparatus. The setting of the height of the support arm 58 required therefor or for the desired number of workpiece panels to be shifted is to be effected fully automatically. After the desired height of the support arm 58 has been fed to a control mechanism during the starting of the entire apparatus, clamping cylinder 54' is closed upon clamping bar 52, which thus causes feed member 50 to be fixed in particular, in its lower initial position, relative to the receiving device 42, and the clamping bar 62, of the support arm 58 is released by the the clamping member 64 of the clamping cylinder 64 so that the support arm 58 may move together with the guide bar 56 relative to the feed member 50. It should be observed in this connection that the support arm 58 automatically adjusts to its lower initial position in which its lower longitudinal edge is located approximately in the plane of the lower end face 66 of the feed member 50.

If, after starting of the above-described apparatus, the panel stack 14 is vertically raised by the lift table 12, the upper workpiece panel comes into contact with the feeler roll 60 in the course of this lifting motion, whereby the support arm 58 is carried along in an upward direction relative to the stationary feed member 50 until the preselected height position of the support member 58. This preselected height position is ascertained in the following manner. As panel stack 14 is raised, support arm 58 is raised, and clamping member is 64' released. As support arm 58 rises, guide bar 56 associated with guide bar 56 rises. As information member 68 rises, sensing member 70 in contact therewith is caused to rotate. The rotation of sensing member 70 is noted by rotary encoder 72, whose construction and operation are well known. When a number of rotations corresponding to a selected elevation of support arm 58 have been noted, rotary encoder 72 causes simultaneous cessation of elevation lift table 12, the release of clamping member 54' and the closing of clamping member 64'. When this position is reached, the lift table is brought to a standstill, the clamping bar 62 attached to the support arm 58 is coupled with the feed member 50 by the clamping cylinder 64 so that the support arm 58 is now immovable relative to the feed member, and the clamping bar 52 is released by the clamping cylinder 54 so that, after the support arm 58 and the feed member 50 are coupled with one another, the latter is displaceable along the vertical guide bar 48.

The feed member 50 is now held only via the support arm 58 and supported on the panel stack 14.

As is apparent from FIG. 1, the individual workpiece panels 16 arranged in superimposed relationship are uneven in that they, for example, exhibit an elevation at 80. One such or several such unevennesses in a workpiece panel are transmitted to the workpiece panels resting thereon, particularly if these are of relatively thin-walled configuration. In the course of the shifting motion, therefore, the front lower edge 82 of the feed member 50 will pass the location of such an elevation 80, and the feeler roll 60 of the support arm 58 will move accordingly in an upward direction in this area during the advancing motion of the feed carriage 28. On account of the coupling of the support arm 58 and the feed member 50, this vertical motion of the feeler roll 60 is also transmitted via the support arm 58 and the clamping bar 62 onto the feed member 50, which ensures that the front lower edge 82 of the feed member 50 cannot penetrate and damage the upper surface of the workpiece panel remaining at the top of the panel stack 14 in the area of the elevation 80. In order to prevent the feed member from touching, during the return motion, the upper surface of the top most panel to be next fed, clamping member 54' is activated to prevent feed member 50 from moving vertically. Alternatively, support arm 58 may be configured of such length as to assure that feeler roll 60 remains on top of the just-fed panels until feed member 50 has completely passed over the panels to be fed.

Accordingly, if the height of the support arm 58 required for shifting one or a desired number of workpiece panels from the panel stack 14 has been fed to the electronic machine control system, the support arms 58 on all panel feed devices 20, 22, 24 automatically assume the desired height position relative to the feed member 50 without any manual work being required on these devices.

What is claimed is:

1. An improved panel feed device arranged on horizontally displaceable feed carriage means for feeding one or more panel type workpieces deposited on a lift table surface means to a panel splitting means along a feed direction, said panel feed device comprising:

feed member means arranged in a vertically displaceable manner on said feed carriage means, so as to abut an edge of one or more of said workpieces with a lower end piece portion of said feed member means;

support arm means extending along substantially said feed direction, beyond said feed member and operably associated therewith in a vertically displaceable and detainable manner respectively thereto so as to be selectively operatively positioned upon said workpiece;

said support arm means and said feed member being further operably associated with said lift table surface means so as to be transferable to a preselected height position in response to elevation of said lift table surface means while said feed member is maintained in a bottom initial position on and relative to said feed carriage means; and said support arm means being automatically restrainable with respect to said feed member means after reaching said preselected height position; and said feed member means being further vertically displaceable relative to said feed carriage means.

2. The apparatus as recited in claim 1, wherein said apparatus further comprises:

receiving device means upon which said feed member means is arranged in a selectively vertically displaceable manner and;

said receiving means being adjustably and detainably mounted on said feed carriage means so as to permit translation of said receiving device means along a direction transverse to said feed direction of said feed carriage means and in parallel relation to said lift table surface means.

3. The apparatus as recited in claim 2, wherein said apparatus further comprises:

a first vertical guide bar means fixedly disposed upon said receiving means, said first vertical guide bar means being operably associated with said feed member so as to guide said feed member on said first vertical guide bar means; and a first clamping means operably associated with said feed member so as to selectively enable fixation of said feed member relative to said first vertical guide bar means.

4. The apparatus as recited in claim 3, wherein said first clamping means comprises:

a first clamping bar, said first clamping bar being disposed fixedly upon and extending vertically away from said receiving means;

a first clamping member, fixedly disposed upon said feed member;

said first clamping member slidably receiving said first clamping bar; and said first clamping member being further enabled to selectively hold or release said first clamping bar.

5. The apparatus as recited in claim 4, wherein said apparatus further comprises:

a second guide bar means operably associated with said feed member so as to be vertically adjustable thereon;

said support arm means being fixed to said second guide bar means; and a second clamping means operably associated with said feed member and said support arm means so as to selectively enable fixation of said feed member relative to said support arm.

6. The apparatus as recited in claim 5, wherein said second clamping means comprises:

a second clamping bar, said second clamping bar being disposed fixedly to and vertically away from said support arm means;

a second clamping feed member fixedly disposed upon said feed member, said second clamping member slidably receiving said second clamping bar; and said second clamping member being further enabled to selectively hold or release said second clamping bar.

7. The apparatus as recited in claim 6, wherein said apparatus further comprises:
a support arm height selection means operably associated with said feed member means for automatic positioning of said support arm means at a desired height position;
said support arm height selection means including said second guide bar means operably associated with said support arm means; and
said support arm height selection means serving to enable preselection of said height position of said support arm means.

8. The apparatus as recited in claim 7, wherein apparatus further comprises:
an information member means operably affixed to and extending parallel to said second guide bar means; and
a sensing member means forming part of said support arm height selection means, affixed to said receiving means and operably associated with said information means.

* * * * *

UNITED STATES PATENT AND TRADEMARK OFFICE
CERTIFICATE OF CORRECTION

PATENT NO. : 4,726,724

DATED : February 23, 1988

INVENTOR(S) : Jenkner

It is certified that error appears in the above-identified patent and that said Letters Patent is hereby corrected as shown below:

Col. 3, line 16     "vertically upward" should be instead
                    -- vertically upwardly --

Col. 3, line 25     "member so can" should be instead
                    -- member 50 can --

Signed and Sealed this

Twenty-fifth Day of October, 1988

Attest:

DONALD J. QUIGG

Attesting Officer

Commissioner of Patents and Trademarks